US006337621B1

United States Patent
Ogino et al.

(10) Patent No.: US 6,337,621 B1
(45) Date of Patent: Jan. 8, 2002

(54) SECURITY AND EMERGENCY COMMUNICATION SERVICE COORDINATION SYSTEM AND NOTIFICATION CONTROL METHOD THEREFOR

(75) Inventors: Takayuki Ogino; Takahiro Katayose; Yoshihide Kobayashi, all of Iwaki (JP); Tsutomu Ogawa, Torrance; Melvin Diaz, La Palma, both of CA (US)

(73) Assignee: Alpine Electronics, Inc.

( * ) Notice: Subject to any disclaimer, the term of this patent is extended or adjusted under 35 U.S.C. 154(b) by 0 days.

(21) Appl. No.: 09/373,420

(22) Filed: Aug. 12, 1999

(30) Foreign Application Priority Data

Aug. 12, 1998 (JP) .......................................... 10-228002

(51) Int. Cl.[7] ................................................ B60Q 1/00
(52) U.S. Cl. ..................... 340/425.5; 340/426; 340/531; 340/825.31; 340/825.32; 307/10.2; 307/10.3
(58) Field of Search ............................... 340/425.5, 426, 340/427, 428, 429, 531, 532, 533, 534, 825.31, 825.32, 825.69, 825.72; 180/173, 287; 307/10.2, 10.3

(56) References Cited

U.S. PATENT DOCUMENTS

| 5,719,551 A | 2/1998 | Flick ........................... 340/426 |
| 5,742,227 A | 4/1998 | Escareno et al. ........... 340/426 |
| 6,028,537 A * | 2/2000 | Suman et al. ............... 340/988 |

\* cited by examiner

Primary Examiner—Daryl Pope
(74) Attorney, Agent, or Firm—Brinks Hofer Gilson & Lione

(57) ABSTRACT

A user is notified of an abnormal condition occurring in a vehicle via a Mayday system. A security apparatus which detects an abnormal condition occurring in a vehicle and which issues an alarm and an emergency communication service apparatus which communicates with a response center and which receives services from the response center during an emergency are connected so that information can be transmitted and received between them. When the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition via the response center.

26 Claims, 11 Drawing Sheets

FIG. 2

| ID NO. | FIRST CONTACT LOCATION | SECOND CONTACT LOCATION | - - - - |
|--------|------------------------|-------------------------|---------|
|        |                        |                         |         |
|        |                        |                         |         |

SECURITY AND EMERGENCY COMMUNICATION SERVICE COORDINATION SYSTEM AND NOTIFICATION CONTROL METHOD THEREFOR

BACKGROUND OF THE INVENTION

1. Field of the Invention

The present invention relates to a system in which a vehicle-mounted security apparatus and an emergency communication service apparatus are coordinated. More particularly, the present invention relates to a security and emergency communication service coordination system which is capable of detecting an abnormal condition occurring in a vehicle, e.g., that a door is ajar, by a security apparatus, notifying a user of the detection of this state via an emergency communication service apparatus, or controlling the security of a vehicle from a location distant from the vehicle.

2. Description of the Related Art

In recent years, because of increasing crime, vandalism of vehicles and thefts occur frequently, and car security apparatuses for coping with this have rapidly become common. FIG. 9 is a block diagram of a car security apparatus. Reference numeral 1 denotes a security apparatus, and reference numeral 2 denotes a remote controller. In the security apparatus 1, reference numeral 3 denotes a security control section comprising a microcomputer, which performs control of starting/stopping (arming/disarming), etc., of security in accordance with a command from the remote controller 2. Reference numeral 4 denotes a transmission and reception section which (1) performs high-frequency amplification, frequency conversion, digital demodulation, etc., in order to receive and demodulate data sent from the remote controller 2, and (2) modulates a carrier wave into digital form by a predetermined modulation method, such as FSK (phase shift keying) modulation, in accordance with data input from the security control section 3, and then performs frequency conversion and power amplification thereon and transmits it to the remote controller 2.

Reference numeral 5 denotes a group of sensors; 5a denotes a door sensor for detecting the open and closed state of the door, 5b denotes a trunk sensor for detecting the opening or closing of a trunk, and 5c denotes a hood sensor for detecting the opening or closing of a hood (bonnet) of a vehicle. In addition to the sensors shown in the figure, motion sensors and other sensors are provided. Reference numeral 6 denotes an alarm unit for generating various alarms when an abnormal condition is detected; 6a denotes a siren driving circuit for sounding a siren, 6b denotes a headlight flashing circuit (flash) for flashing a head lamp, and 6c denotes a starter cut section for disabling engine ignition.

In such a car security system, when a driver exits a car and closes the door, after the driver presses a dual-purpose arming/disarming key of a remote controller, the remote controller emits radio waves such that a carrier wave is converted into digital form in accordance with transmission data (ID code, arming instruction code, etc.). The radio waves are received by an antenna of the security main unit disposed in the vehicle and are input to the transmission and reception section 4 whereby the radio waves are received and demodulated. Subsequently, the security control section 3 checks if the received ID code matches the ID code which has been pre-entered into a built-in memory (not shown). If they match each other, an arming operation (security operation) is started. When the security apparatus has been armed, outputs from various sensors, such as door sensors, hood (bonnet) sensors, trunk sensors, etc., are monitored, and when a predetermined sensor is triggered, an alarm is generated. For example, when a door sensor detects the opening of a door during arming, the security main unit drives the siren, performs flashing control of a head lamp, or disables (ignition cutoff) ignition of the engine in order to prevent theft.

Also, coming into common use recently is an emergency communication service system in which a connection is established with a specific location (response center) via a portable telephone network, and various services can be received from the response center during an emergency. This is called a "Mayday system" in the United States. FIG. 10 is a block diagram of a Mayday system. Reference numeral 11 denotes a vehicle-mounted emergency communication service apparatus (Mayday unit). Reference numeral 12 denotes a response center which responds to a request from the emergency communication service apparatus (Mayday unit). Reference numeral 13 denotes an emergency center for dispatching an ambulance, etc., in accordance with an instruction from the response center. Reference numeral 14 denotes a road side assistance center (corresponding to JAF (Japan Automobile Federation)) which deals with car troubles, such as flat tires and running out of gasoline. In the emergency communication service apparatus (Mayday unit) 11, 11a denotes a Mayday unit control section which comprises a car telephone transmission and reception section, a GPS (Global Positioning System) receiving section for measuring the car position, an acoustic circuit, and a microcomputer for control; 11b denotes a cellular antenna (antenna for car telephone); 11c denotes a GPS antenna; 11d denotes a portable telephone terminal; 11e denotes an operation section (key/LED section), 11f denotes a microphone; 11g denotes a speaker; 11h denotes an automatic door lock unit; and 11i denotes an engine disabling unit.

Examples of services of the Mayday system include:
(1) notification of an accident,
(2) remote door unlock when locked with the key inside,
(3) roadside assistance,
(4) engine disable,
(5) navigation assistance, and
(6) search for stolen car.

The "notification of an accident" in service (1) is a service in which a user calls the response center 12 by operating a predetermined key of the operation section 11e so as to notify the response center of an accident from the portable telephone unit 11d. The response center 12 notifies the emergency center 13 and the police station so as to arrange for emergency and accident procedures. The "remote door unlock when a door is locked with the key inside" in service (2) is a service in which a notification is made to the response center 12 by telephone, and an unlock command is sent from the response center to the Mayday unit control section 11a in order to perform automatic unlock. The "roadside assistance" in service (3) is a service in which, when there is a flat tire, the user runs out of gasoline, etc., the response center 12 is called to notify of the necessity of road side assistance from the portable telephone unit 11d. The response center 12 notifies the road side assistance center 14 to arrange to send an assistance crew. The "engine disable" in service (4) is a service in which, when a car is carjacked, the response center 12 is notified by telephone, and an ignition cutoff command is sent to the Mayday unit control section 11a from the response center so that the ignition of the engine is disabled. The "navigation assistance" in service (5) is a service in which an operator of the response center 12 gives route guidance to a destination by voice. The "search for stolen car" in service (6) is a service in which, when a car is stolen, the response center 12 is notified by telephone, and a car position request command is sent from the response center to the Mayday unit control section 11a so that the car position is obtained by the Mayday unit control section 11a and provided to the user.

In the manner as described above, generally, the Mayday system makes it possible to receive various services when the user operates the operation section 11e inside the car in order to connect the Mayday unit 11 to the response center 12 or when the user communicates with the response center 12 by using an external telephone unit. However, since the construction of the system is such that the user makes a connection request to the response center regarding car security, as in the "search for stolen car" in service (6) after the damage has occurred, the user notices the damage and provides notification, the notification is too late and insufficient from the viewpoint of security.

Some conventional security apparatuses have a door-ajar alarm function that utilizes a door sensor. However, it may be the case that some time is required until the door being ajar is recognized and an alarm is issued, and therefore, the user is far away from the car by the time the alarm is sounded, and the door-ajar alarm does not reach the user. FIGS. 11A and 11B are illustrations of conventional door-ajar alarms. In the security apparatus 1, the door is closed, and subsequently, arming is instructed from the remote controller 2. When the door is closed, the intensity of the interior lamp is gradually decreased, and consequently, the door sensor recognizes that the door is closed as a result of the fact that the interior lamp voltage falls below a predetermined level. From the foregoing, in the security apparatus 1, after arming, after an elapse of T seconds (for example, 10 seconds), a determination is made as to the open or closed state of the door. When the door is closed, this is considered to be desirable (FIG. 11A). However, as shown in FIG. 11B, when the door is open, a door-ajar alarm is given. However, since T seconds have elapsed, it may be that the user is considerably away from the car and does not notice the door-ajar alarm.

Also, it may be desired to confirm whether the security of a vehicle is in operation (is armed) from a distant location, such as a location of a person during a trip or a place at which the person is staying. However, this has hitherto been impossible.

SUMMARY OF THE INVENTION

Accordingly, an object of the present invention is to coordinate a security system and a Mayday system so as to make it possible to notify a response center of an abnormal condition of a car, as detected by a security apparatus, and furthermore, to notify a user.

Another object of the present invention is to make it possible to determine whether the abnormal condition is caused by a malfunction of a sensor or a thief actually trying to steal a car, by sending abnormal-condition-detected notification together with sounds from within the vehicle to a response center at the same time. In the case of malfunction, alarms (sirens, flashes, etc.) are quickly stopped. Alternatively, if a thief is trying to steal a car, a continuous alarm mode (panic mode) is set to thwart the thief.

A further object of the present invention is to coordinate a security system and a Mayday system so as to make it possible to notify, via the Mayday system, a response center that a door is ajar, as detected by a security apparatus, and furthermore, to notify a user.

A still further object of the present invention is to coordinate a security system and a Mayday system so as to make it possible to confirm whether the security system in a vehicle is in operation (has been armed) from a distant location, such as the location of a person on a trip or a place where the person is staying, and furthermore, to set an arming mode if the security system is not armed.

According to the present invention, the above-mentioned objects are achieved by connecting a security apparatus, which detects an abnormal condition occurring in a vehicle and issues an alarm, and an emergency communication service apparatus, which notifies a response center of an emergency condition during an emergency, so that information can be mutually transmitted and received. The security apparatus can notify the emergency communication service apparatus of the occurrence of an abnormal condition when the security apparatus detects the abnormal condition occurring in the vehicle, and in response to the notification, notify the user of the occurrence of the abnormal condition via the response center by the emergency communication service apparatus. In such a case, the response center prestores the correspondence among the vehicle ID numbers and the telephone numbers or the pager numbers of the contact locations so that the emergency communication service apparatus sends the vehicle ID number together with the abnormal-condition occurrence notification to the response center, and the response center calls the contact location indicated by the vehicle ID number in order to notify the user of the occurrence of the abnormal condition. As a result of the above, it is possible for the user to be quickly informed of the occurrence of an abnormal condition and to deal with the illicit actions of a thief, thereby preventing the theft of the vehicle.

Furthermore, in the present invention, when the emergency communication service apparatus transmits sounds from within the vehicle together with the abnormal-condition occurrence notification and receives a command for stopping an alarm state or a command for setting a continuous panic mode from the response center, the emergency communication service apparatus sends the command to the security apparatus so that the security apparatus is made to operate in accordance with the command. By transmitting sounds from within the vehicle together with the abnormal-condition occurrence notification at the same time, it is possible for the response center to determine whether the sensor has malfunctioned or whether a thief is actually trying to steal the car. In the former case, the alarm is quickly stopped, or in the latter case, the continuous panic mode is set to thwart the thief.

Furthermore, in the present invention, when arming is instructed, the security apparatus detects the opening or closing of the door after an elapse of a predetermined time. When the door is open, the security apparatus determines that a door is ajar and notifies the emergency communication service apparatus. In response to the notification, the emergency communication service apparatus notifies, via the response center, the user that a door is ajar. When this is done, it is possible for the user to reliably be informed that a door is ajar and to deal with it.

Furthermore, in the present invention, when the emergency communication service apparatus receives an inquiry from the response center as to whether or not the security apparatus has been armed, the emergency communication service apparatus identifies the operating state of the security apparatus and notifies the response center. Also, when the security apparatus has not been armed, the emergency communication service apparatus can cause the security apparatus to be armed. As a result, it is possible for the user to confirm whether the security of the vehicle is in operation (is armed) via the response center from a distant location, such as a trip location, and furthermore, if the security apparatus is not armed, the security apparatus can be placed in an armed mode.

The above and further objects, aspects and novel features of the invention will become more apparent from the following detailed description when read in connection with the accompanying drawings.

BRIEF DESCRIPTION OF THE DRAWINGS

FIG. 2 is an illustration of an example in which user contact locations are stored.

DESCRIPTION OF THE PREFERRED EMBODIMENT

(A) Overall Construction

Figure 1:
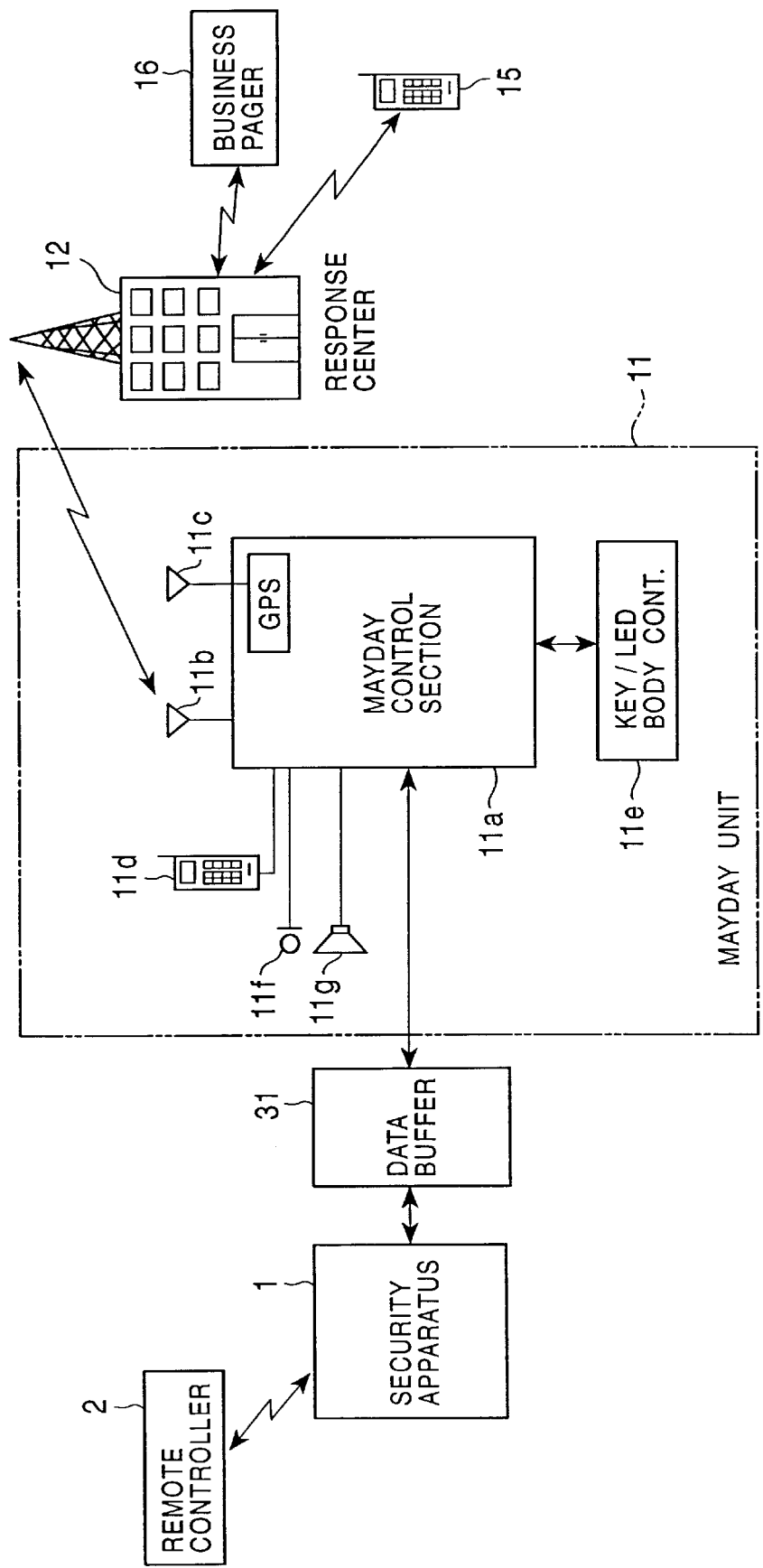
FIG. 1 is a diagram of the overall system configuration according to the present invention.

FIG. 1 is a configuration diagram of a coordination system in which a security apparatus and an emergency communication service apparatus (Mayday unit) are coordinated according to the present invention. Referring to FIG. 1, reference numeral 1 denotes a security apparatus for detecting an abnormal condition occurring in a vehicle and for issuing an alarm. Reference numeral 2 denotes a remote controller for instructing the security apparatus so that it is armed or disarmed. Reference numeral 11 denotes an emergency communication service apparatus (Mayday unit). Reference numeral 12 denotes a response center. Reference numeral 15 denotes a portable telephone unit possessed by a user. Reference numeral 16 denotes a business pager (e.g., a Pocket Bell (pocket pager) from Nippon Telegraph and Telephone Corp. (NTT)). Also, reference numeral 31 denotes a data transmission and receiving buffer for controlling exchange of information between the security apparatus 1 and the Mayday unit 11.

In the emergency communication service apparatus (Mayday unit) 11, 11a denotes a Mayday unit control section which comprises a car telephone transmission and reception section, a GPS (Global Positioning System) receiving section for measuring the car position, an acoustic circuit, and a microcomputer for control; 11b denotes a cellular antenna (antenna for car telephone); 11c denotes a GPS antenna; 11d denotes a portable telephone terminal; 11e denotes an operation section (key/LED section); 11f denotes a microphone; and 11g denotes a speaker.

The emergency communication service apparatus (Mayday unit) 11 communicates with the response center during an emergency in order to receive services provided by the response center 12, and operates in accordance with a command sent from the response center 12. The response center 12 provides predetermined services in response to a request from the Mayday unit 11 and sends a command to the emergency communication service apparatus 11 in order to instruct it to operate in accordance with the command. Also, when the response center 12 receives abnormal-condition occurrence notification and door-ajar notification from the Mayday unit 11, the response center 12 calls the portable telephone unit 15 or the business pager 16 possessed by the user in order to notify the user of the occurrence of the abnormal condition and the door-ajar state.

FIG. 2 is an illustration of information of user contact locations stored in a database of the response center 12, in which a first contact location, a second contact location, etc., are made to correspond to the ID number of the vehicle. As contact location numbers, portable telephone numbers, business pager numbers, home telephone numbers, and the like, are entered into the database. Since the vehicle ID number, together with abnormal-condition occurrence notification and door-ajar notification, is sent from the Mayday unit 11, the contact location number of the user is obtained by referring to the database on the basis of the vehicle number, and the user is called to notify of the occurrence of the abnormal condition and the door-ajar state.

Figure 9:
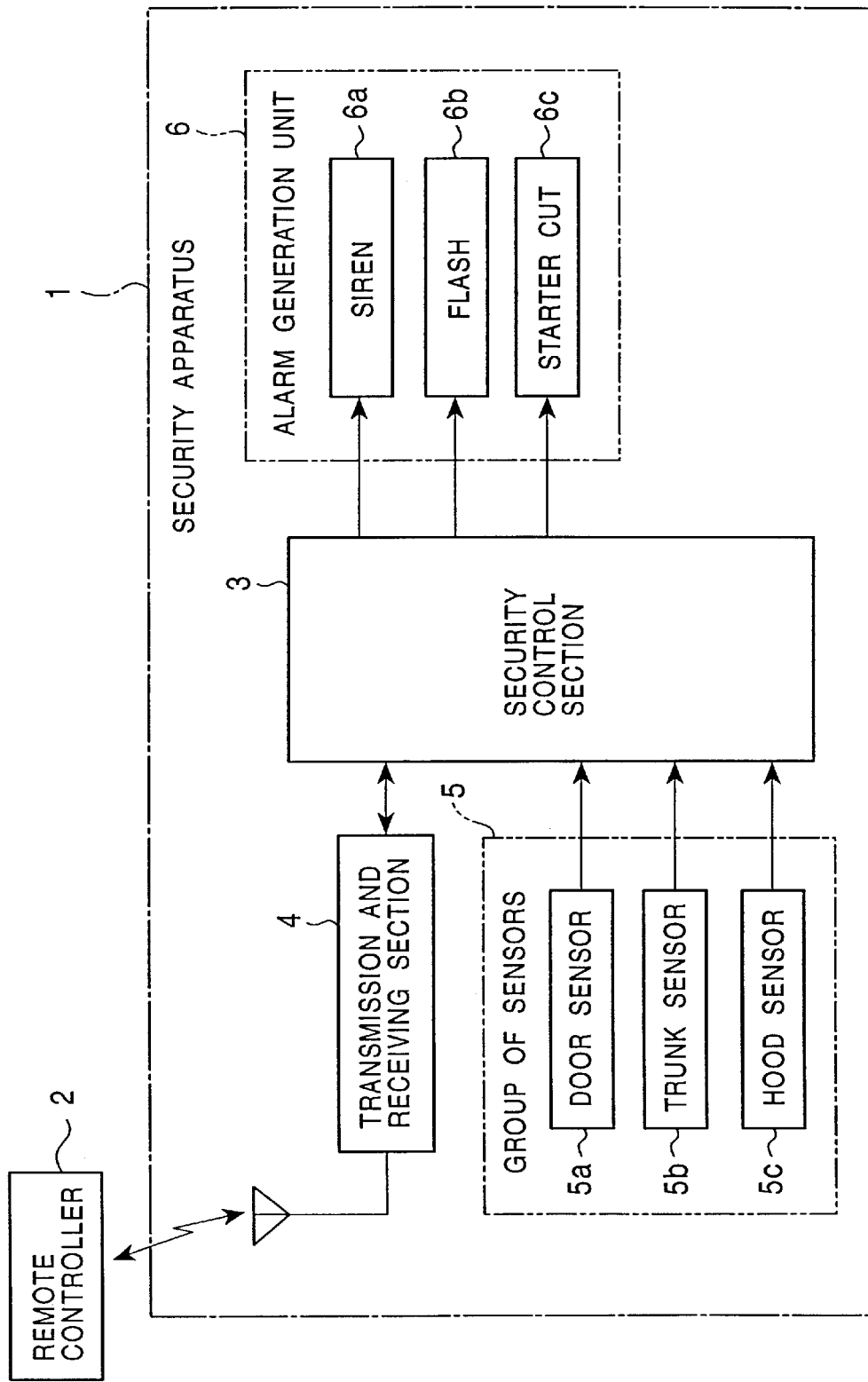
FIG. 9 is a block diagram of a conventional security apparatus.
Figure 10:
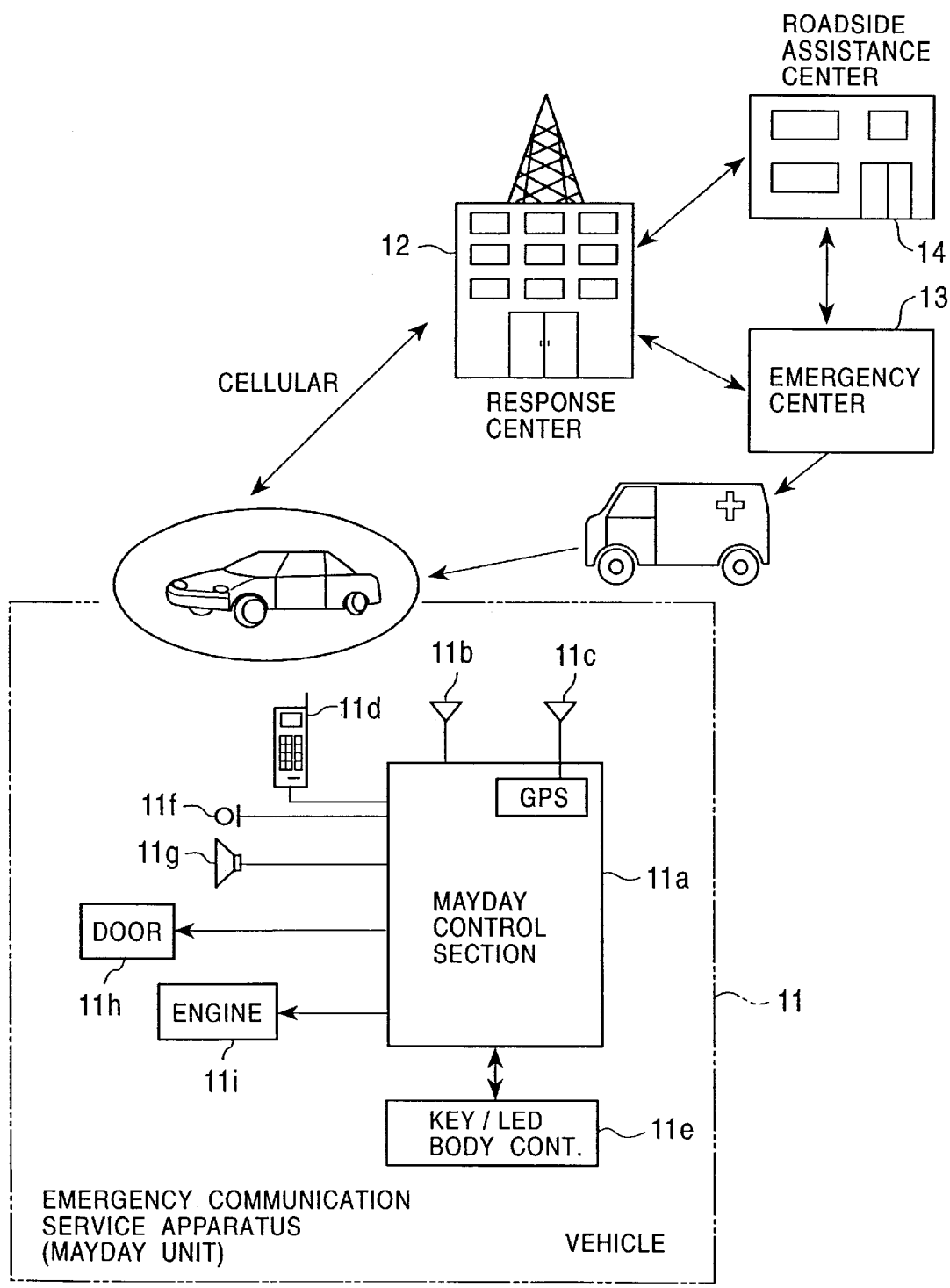
FIG. 10 is a configuration diagram of a conventional emergency communication service system (Mayday system).
Figure 11A:
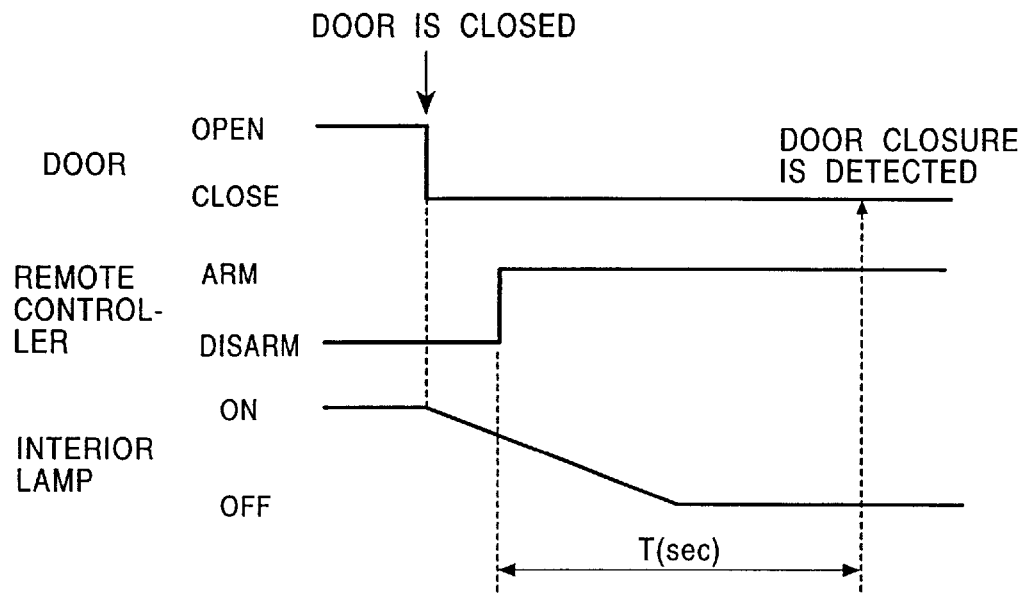
FIGS. 11A and 11B are illustrations of the conventional operation of a door-ajar alarm.
Figure 11B:
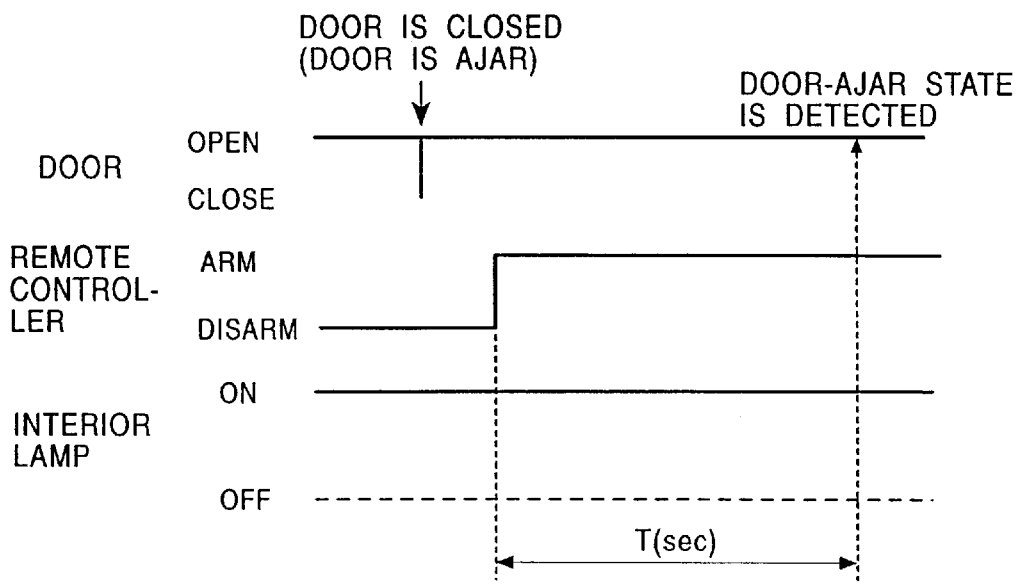

The security apparatus 1 has the construction shown in FIG. 9, and the Mayday unit 11 has the construction shown in FIG. 10. The security apparatus 1 and the Mayday unit 11 are connected so that data can be mutually transmitted and received via the data transmission and receiving buffer 31.

Figure 3:
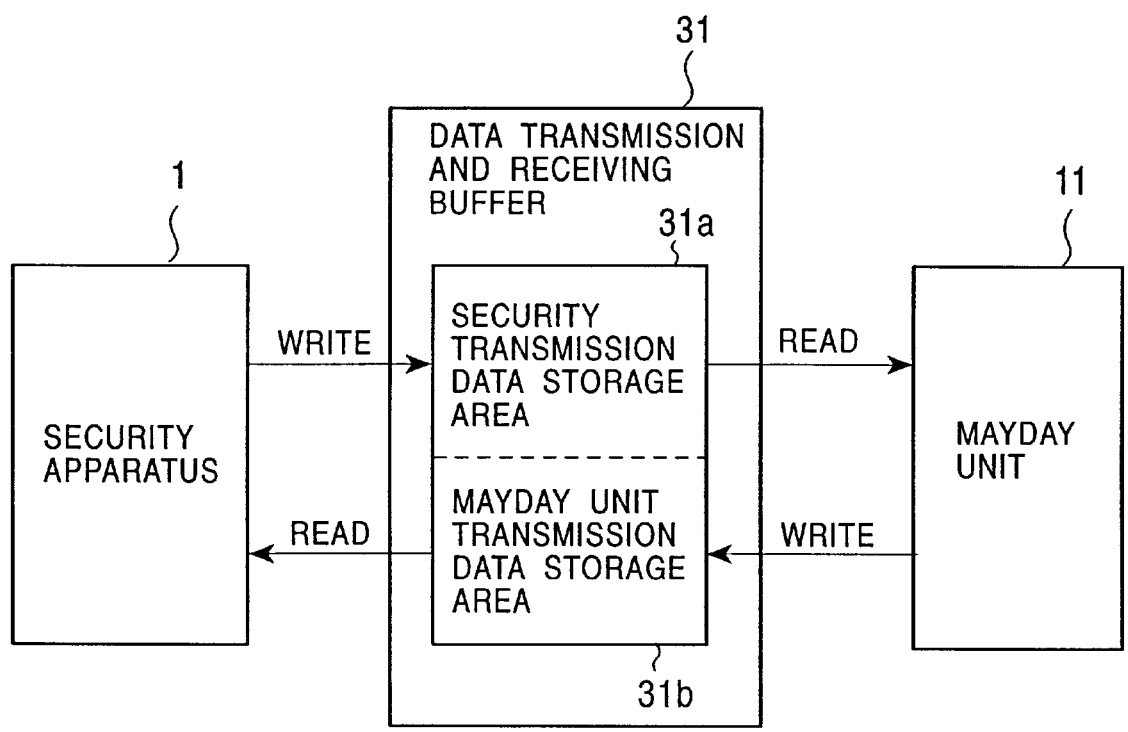
FIG. 3 is an illustration of an example of communication between a security apparatus and a Mayday unit.

FIG. 3 is a block diagram of an example of a method of communication between the security apparatus 1 and the Mayday unit 11. The data transmission and receiving buffer 31 is connected to the internal bus of the security apparatus 1 and the Mayday unit 11 so that data can be read and written from each of them. Shown in FIG. 3 are a security transmission data storage area 31a for storing data to be transmitted from the security apparatus 1 to the Mayday unit 11, and a Mayday unit transmission data storage area 31b for storing data to be transmitted from the Mayday unit 11 to the security apparatus 1. When there is data to be transmitted to the Mayday unit 11, the security apparatus 1 writes the data into the security transmission data storage area 31a, and the Mayday unit 11 reads the contents of the security transmission data storage area 31a at a predetermined cycle, making it possible to perform transmission of data from the security apparatus 1 to the Mayday unit 11. Also, when there is data to be transmitted to the security apparatus 1, the Mayday unit 11 writes the data into the Mayday unit transmission data storage area 31b, and the security apparatus 1 reads the contents of the Mayday unit transmission data storage area 31b at a predetermined cycle, making it possible to perform transmission of data from the Mayday unit 11 to the security apparatus 1.

Figure 4:
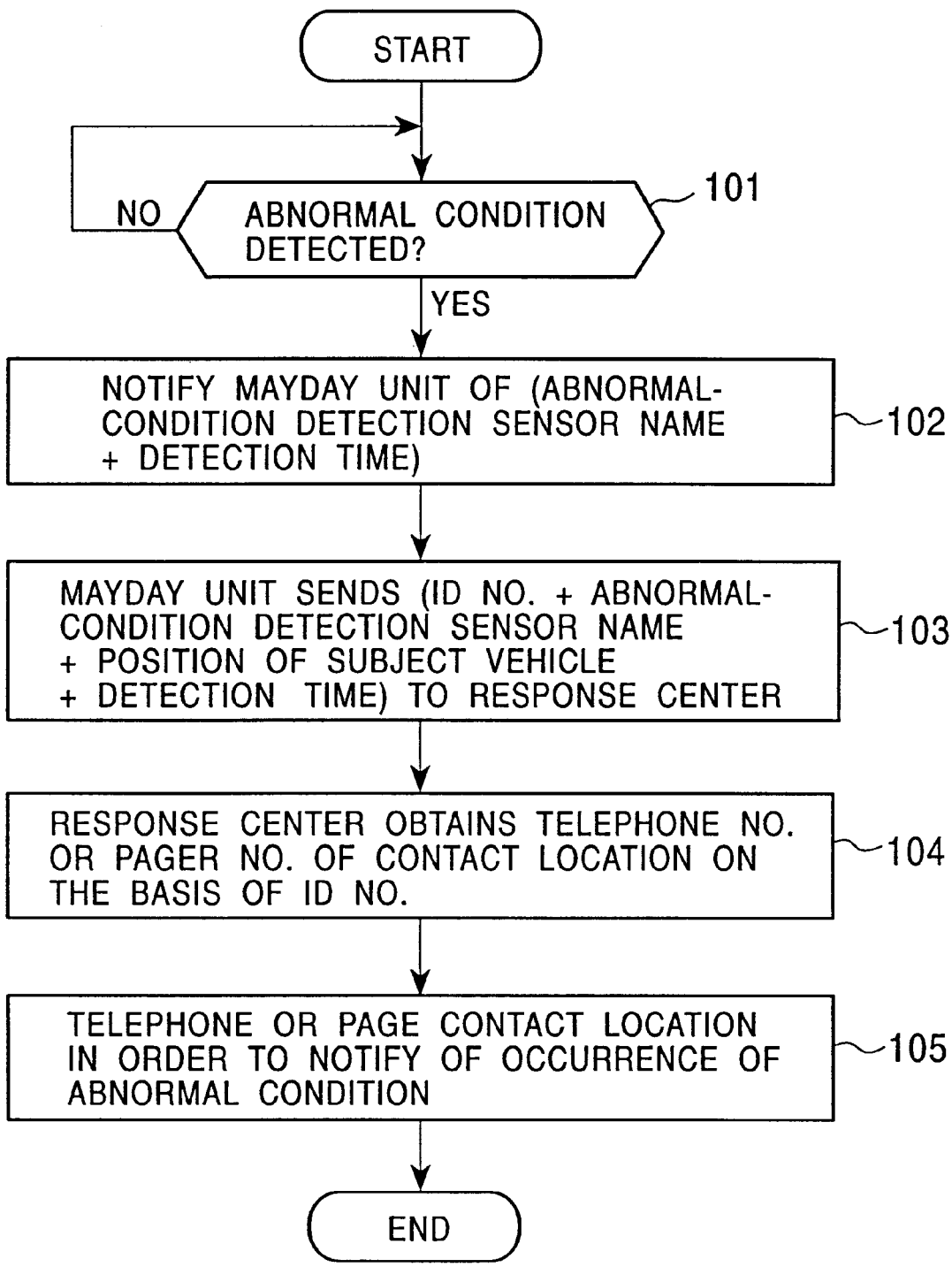
FIG. 4 is a flowchart of a process for automatic notification control when an abnormal condition is detected.

(B) Automatic Notification Control Process When Abnormal Condition is Detected FIG. 4 is a flowchart of a process for notifying a user of the occurrence of an abnormal condition when the security apparatus detects the abnormal condition.

When the security apparatus 1 detects an abnormal condition occurring in the vehicle (step 101), the security apparatus 1 notifies the Mayday unit 11 of the abnormal-condition-detected sensor name the abnormal-condition-detected time (step 102). When the abnormal-condition-detected notification is received, the Mayday unit 11 obtains the current position of the subject vehicle by a GPS receiving circuit and creates data ((1) vehicle ID number+(2) abnormal-condition-detected sensor name+(3) position of the subject vehicle+(4) detection time) to be transmitted to the response center 12. Then, the security apparatus 1 makes an automatic call to the response center 12 via the portable telephone network in order to establish a connection, after which the Mayday unit 11 sends the created transmission data to the response center (step 103).

The response center 12 determines the contact location number corresponding to the vehicle ID number contained in the received data by referring to the database and displays the received data and the contact location number on a monitor (step 104). In response to this, the operator of the response center 12 makes a call to the contact location number in order to notify the user of the occurrence of the abnormal condition (step 105). In this case, if a connection with the first contact location cannot be established, the operator makes a call to a second contact location in order to send the notification. The user receiving the abnormal-condition occurrence notification can go to the user's own vehicle and thwart a thief.

In the meantime, there is a case in which the security apparatus 1 regards that an abnormal condition has occurred due to the malfunction of a sensor (in particular, a motion sensor). Even with such a malfunction of the sensor, the security apparatus generates an alarm (siren, flash, ignition cutoff) for a predetermined time. However, in the case of a malfunction, it is necessary to quickly stop the alarm, whereas when a thief is actually performing an illicit action, it is necessary to continuously generate an alarm without stopping so as to thwart the thief.

Figure 5:
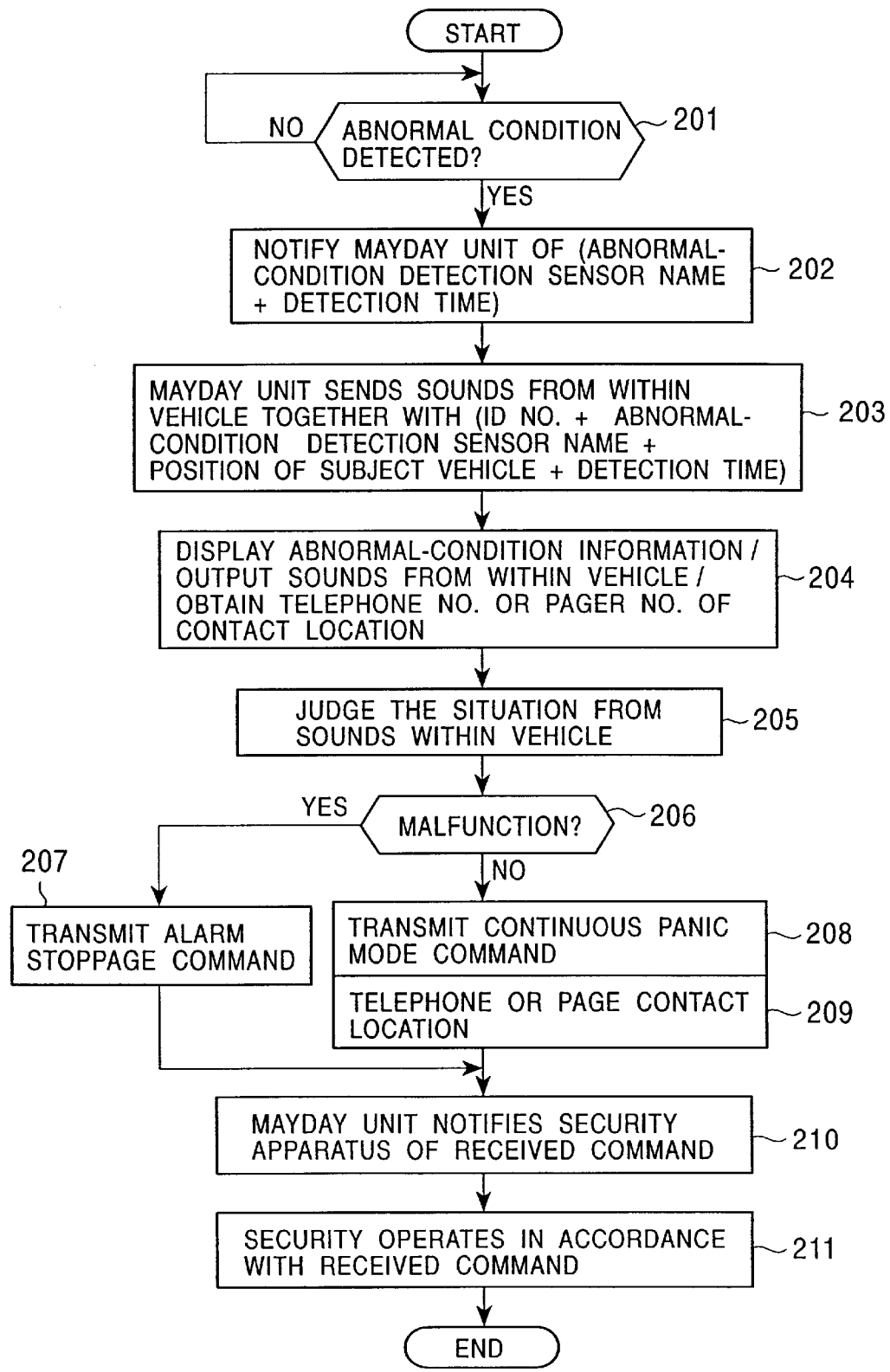
FIG. 5 is a flowchart of another process for automatic notification control when an abnormal condition is detected.

FIG. 5 is a flowchart of a process in which a determination can be made as to whether the abnormal condition is caused by a malfunction. When the abnormal condition is caused by a malfunction, the alarm is stopped, whereas when the abnormal condition is not caused by a malfunction, a continuous alarm (panic mode) is set.

When the security apparatus 1 detects an abnormal condition occurring in a vehicle (step 201), the security apparatus 1 notifies the Mayday unit 11 of the abnormal-condition-detected sensor name and the abnormal-condition-detected time (step 202). When the abnormal-condition-detected notification is received, the Mayday unit control section 11a of the Mayday unit 11 obtains the current position of the subject vehicle by the GPS receiving circuit and creates data ((1) vehicle ID number+(2) abnormal-condition-detected sensor name+(3) position of the subject vehicle+(4) detection time) to be transmitted to the response center 12. Also, sounds from within the vehicle are picked up from the microphone 11f and are converted from analog into digital form. Then, a call is automatically made to the response center 12 via the portable telephone network in order to establish a connection, after which the created transmission data and the sounds (digital) from within the vehicle are sent to the response center 12 (step 203).

The response center 12 determines the contact location number corresponding to the vehicle ID contained in the received data by referring to the database, displays the received data and the contact location number on the monitor, and outputs the sounds from within the vehicle through a speaker (step 204).

The operator of the response center 12 judges the situation of the subject vehicle on the basis of the sounds from within the vehicle (step 205). Whether or not a thief is performing an illicit action can be determined on the basis of the sounds from within the vehicle. Therefore, when the inside of the vehicle is quiet, it is determined that the abnormal condition is caused by the malfunction of the sensor, and when the inside of the vehicle is noisy and a thief is clearly performing an illicit action, it is determined that the sensor is normal (step 206). In the case of the malfunction of the sensor, an alarm termination command is sent from the response center 12 to the Mayday unit 11 (step 207), and when it is not the malfunction of the sensor, a panic mode command is sent (step 208). Also, the operator notifies the contact location which has been entered of the occurrence of the abnormal condition (step 209).

The Mayday unit 11 notifies the security apparatus 1 of the received command (step 210), and the security apparatus 1 performs an operation in accordance with the received command (alarm termination command or panic mode command) (step 211). That is, when the command is an alarm termination command, the alarm is immediately stopped, and when the command is a panic mode command, the alarm is continued without terminating the alarm even if a predetermined time elapses.

In a manner as described above, by sending the sounds from within the vehicle together with the abnormal-condition occurrence notification, it is possible for the response center to determine whether the sensor has malfunctioned or whether a thief is actually trying to steal the vehicle. In the former case, the alarm is quickly stopped, and in the latter case, the continuous panic mode is set to thwart the thief.

(C) Door-Ajar Notification Control Process

Figure 6:
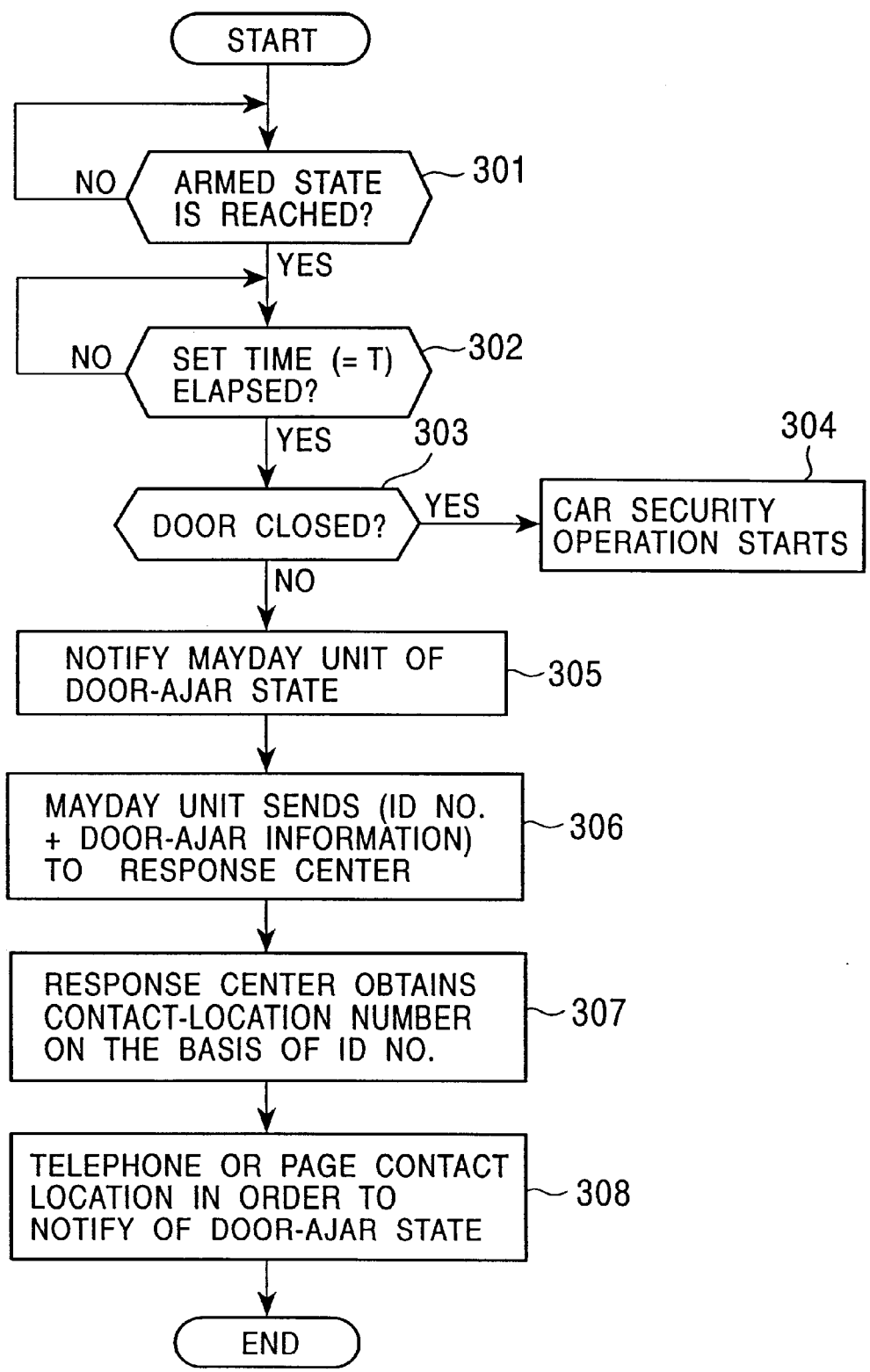
FIG. 6 is a flowchart of a process for door-ajar notification control.

FIG. 6 is a flowchart of a process for detecting a door-ajar state and notifying a user. After the system is armed, the opening or closing of the door is detected after an elapse of a predetermined time. When the door is open, it is determined that the door is ajar, and this is notified to the Mayday unit 11.

In response to the notification, the Mayday unit 11 notifies a user of the door-ajar state via the response center 12.

More specifically, the security apparatus 1 monitors whether an armed state is reached (step 301). When the armed state is reached, a check is made to determine whether or not a set time (=T seconds) has elapsed (step 302). When the set time has elapsed, a check is made to determine whether or not the door is open (step 303). When the door is closed, the car security operation is started (step 304). However, when the door is open, the door is regarded as being ajar, and a notification is provided to the Mayday unit 11 that the door is ajar (step 305). In response to this notification, the Mayday unit 11 automatically makes a call to the response center 12 via the portable telephone network in order to establish a connection, and subsequently, adds door-ajar information to the vehicle ID number and sends it to the response center (step 306). The response center 12 determines, by referring to the database, the contact location number corresponding to the vehicle ID number contained in the received data, and displays the received data and the contact location number on the monitor (step 307). In response to this, the operator of the response center 12 makes a call to the contact location number in order to notify the user of the door-ajar state (step 308).

From the foregoing, even if the user is away from the vehicle when the door-ajar state is detected, it is possible to reliably notify the user of the door-ajar state via the response center 12.

(D) Armed-state Confirmation Control Process

Figure 7:
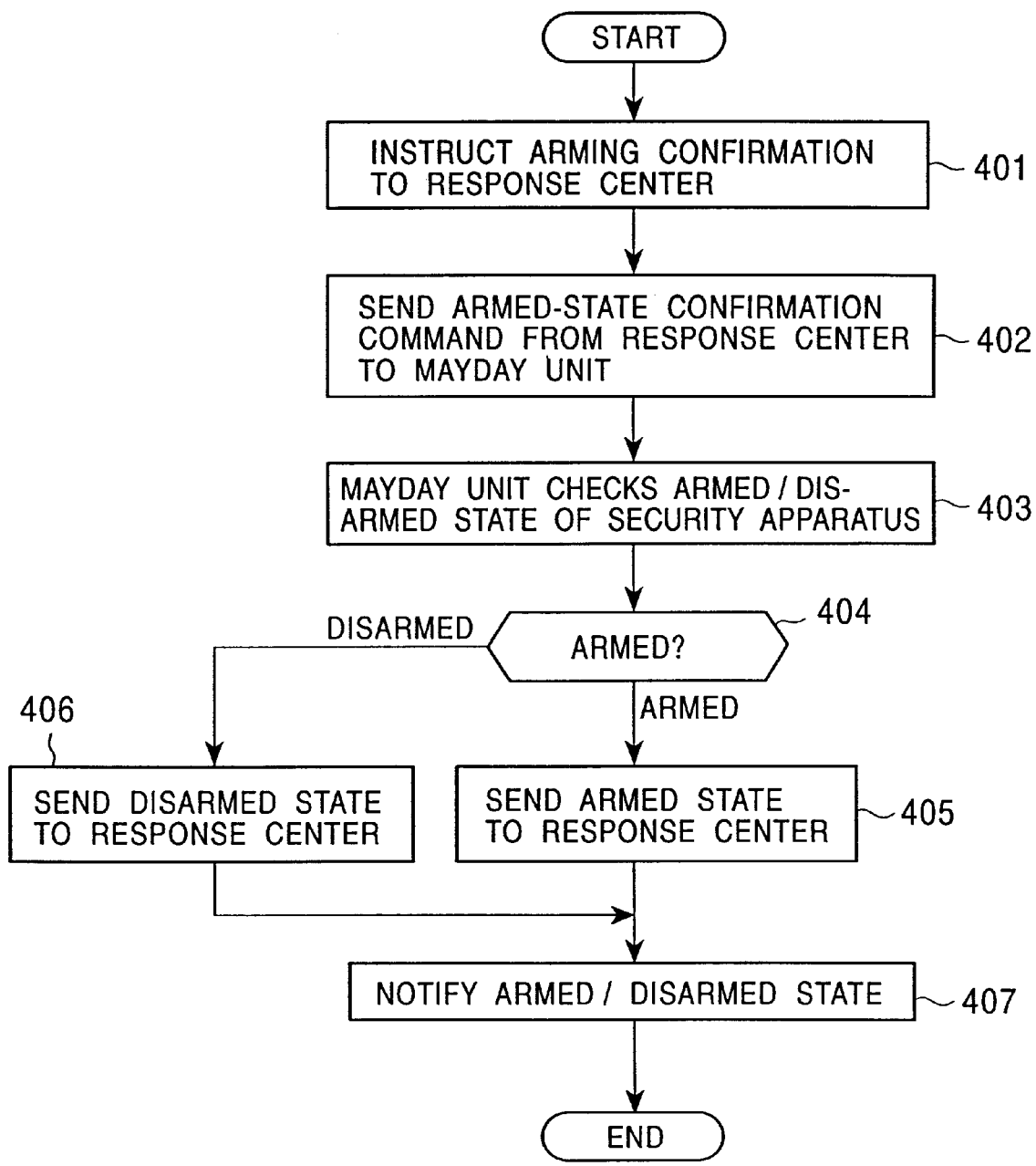
FIG. 7 is a flowchart of a process for armed-state confirmation control.

There may be a case in which a user wishes to confirm whether the security system in the user's vehicle is currently armed from a distant location, such as a location of the user during a trip or a place at which the user is staying. FIG. 7 is a flowchart of an armed-state confirmation control process.

An instruction for confirming an armed state is provided by telephone to an operator of the response center 12 (step 401). In response to this, the operator calls the car telephone of the user, and sends the armed-state confirmation command to the Mayday unit 11 (step 402). The Mayday unit 11 checks whether or not the security apparatus 1 is armed (steps 403 and 404). When the security apparatus 1 is armed, "armed" is sent to the response center 12 (step 405), and when the security apparatus 1 is disarmed, "disarmed" is sent to the response center 12 (step 406). The operator then notifies the user of the armed/disarmed state (step 407).

Figure 8:
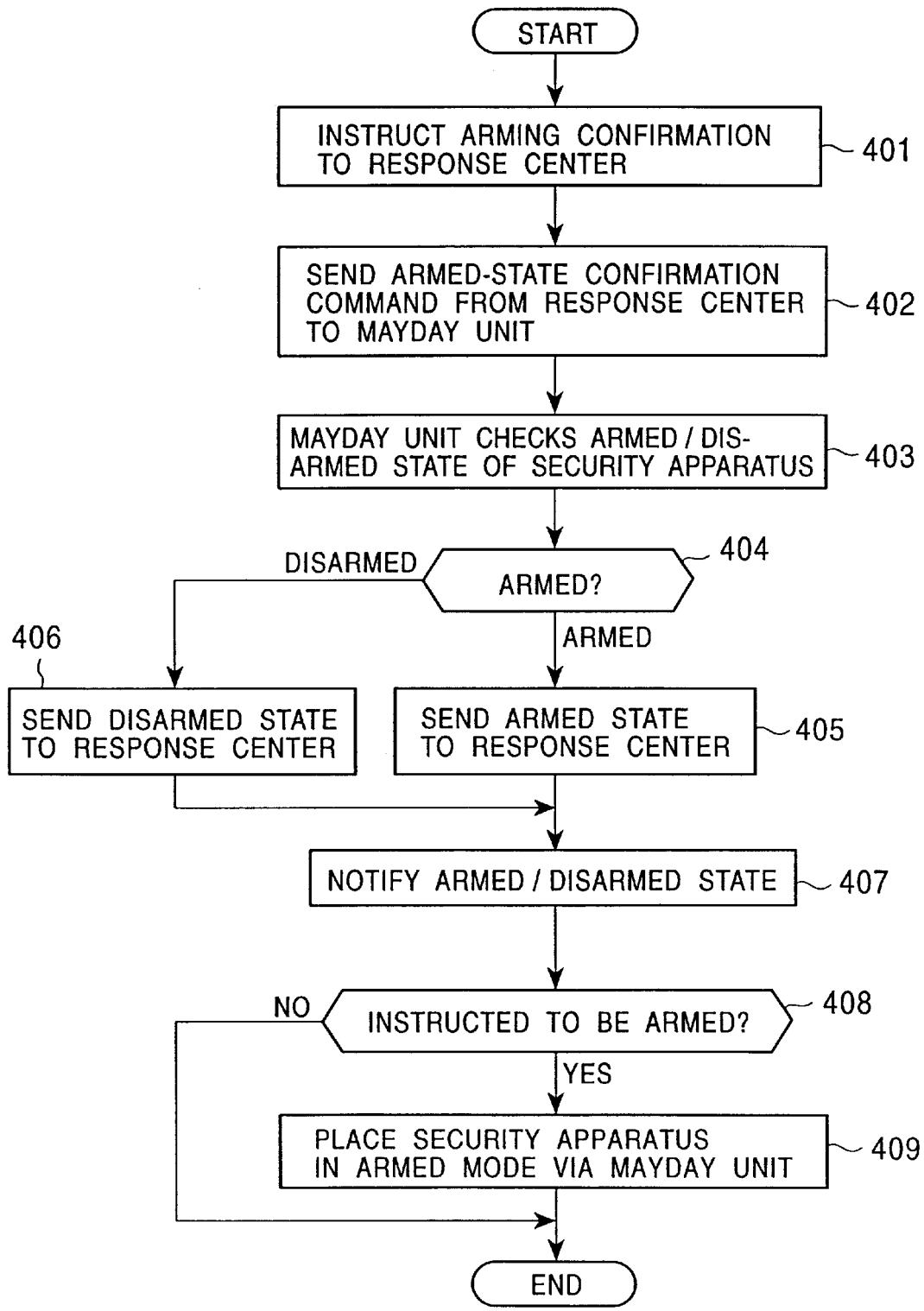
FIG. 8 is a flowchart of another process for armed-state confirmation control.

FIG. 8 is a modification of FIG. 7, in which when the security apparatus 1 is disarmed, it is placed in an armed mode, and processing from steps 401 to 407 is the same as that of FIG. 7. In step 407, when the operator notifies the user of the disarmed state and the operator is instructed by the user to arm the security apparatus 1 (step 408), the operator sends the arming command to the security apparatus 1 via the Mayday unit 11 so that the security apparatus is placed in an armed mode (step 409).

In the example of FIG. 8, although an armed mode is set in accordance with an instruction from the user, it is possible to automatically set the security apparatus to an armed mode irrespective of the instruction from the user if the security apparatus is disarmed.

As has been described up to this point, according to the present invention, when the security apparatus detects an abnormal condition occurring in a vehicle, the security apparatus notifies an emergency communication service apparatus (Mayday unit) of the occurrence of the abnormal condition, and in response to the notification, the emergency communication service apparatus notifies a user of the occurrence of the abnormal condition via a response center. This makes it possible for the user to be quickly informed of the occurrence of the abnormal condition and to deal with an illicit action of a thief, thereby effectively preventing theft of the vehicle. In this case, as a result of prestoring the correspondence between the vehicle ID numbers and the telephone numbers or the pager numbers of the contact locations, it is possible to notify the contact location, indicated by the vehicle ID number which is sent together with the abnormal-condition occurrence notification, of the occurrence of the abnormal condition. When a contact with the first contact location cannot be made, it is possible to call a second or a third contact location and to notify the user of the occurrence of the abnormal condition.

Also, according to the present invention, since sounds from within the vehicle are transmitted together with the abnormal-condition occurrence notification, it is possible for the response center side to determine whether the sensor has malfunctioned or whether a thief is actually trying to steal the vehicle. In the former case, the alarm is quickly stopped, and in the latter case, a continuous panic mode can be set to thwart the thief.

Also, according to the present invention, when arming is instructed, the security apparatus detects the opening or closing of a door after an elapse of a predetermined time. When the door is open, the security apparatus determines that the door is ajar and notifies the emergency communication service apparatus. In response to the notification, the emergency communication service apparatus notifies a user, via the response center, that the door is ajar. This makes it possible to reliably inform the user that the door is ajar.

Also, according to the present invention, when the emergency communication service apparatus receives, from the response center, an inquiry as to whether or not the security apparatus is armed, the emergency communication service apparatus identifies the operating state of the security apparatus and notifies the response center. In this case, if the security apparatus is not armed, the security apparatus is placed in an armed mode. Consequently, it is possible for the user to confirm that the security of the vehicle is in operation (has been armed) from a distant location, such as the location of the user on a trip or a place where the user is staying, and furthermore, to set the security apparatus in an armed mode if the security apparatus is not armed.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A security and emergency communication service coordination system for vehicles, comprising:

a security apparatus for detecting an abnormal condition occurring in a vehicle and for issuing an alarm; and an emergency communication service apparatus for notifying a response center of an emergency state during an emergency, wherein the security apparatus and the emergency communication service apparatus are connected so that information can be transmitted and received between them; the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition via the response center, and wherein said response center prestores the correspondence among the vehicle ID numbers and the telephone numbers or the pager numbers of the contact locations, the emergency communication service apparatus sends the vehicle ID number together with an abnormal-condition occurrence notification to the response center, and the response center calls the contact location indicated by the vehicle ID number to notify the user; and wherein said emergency communication service apparatus notifies the user of an abnormal condition-detected sensor name via the response center.

2. A security and emergency communication service coordination system according to claim 1, wherein said response center prestores the correspondence among the vehicle ID numbers and the telephone numbers or the pager numbers of a plurality of contact locations, the emergency communication service apparatus sends the vehicle ID number together with the abnormal-condition occurrence notification to the response center, and when the response center calls a first contact location indicated by the vehicle ID number and cannot notify the user, the response center calls a second contact location in order to notify the user of the occurrence of the abnormal condition.

3. A security and emergency communication service coordination system for vehicles, comprising:
   a security apparatus for detecting an abnormal condition occurring in a vehicle and for issuing an alarm; and
   an emergency communication service apparatus for notifying a response center of an emergency state during an emergency, wherein the security apparatus and the emergency communication service apparatus are connected so that information can be transmitted and received between them; the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition via the response center, and wherein said emergency communication service apparatus notifies the user of an abnormal-condition-detected sensor name via the response center.

4. A security and emergency communication service coordination system for vehicles, comprising:
   a security apparatus for detecting an abnormal condition occurring in a vehicle and for issuing an alarm; and
   an emergency communication service apparatus for notifying a response center of an emergency state during an emergency, wherein the security apparatus and the emergency communication service apparatus are connected so that information can be transmitted and received between them: the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition via the response center, and wherein said emergency communication service apparatus transmits sounds from within the vehicle together with the abnormal-condition occurrence notification and receives a command from the response center for terminating an alarm state or a command for issuing an alarm, the emergency communication service apparatus then transmitting the command to the security apparatus.

5. A security and emergency communication service coordination system for vehicles, comprising:
   a security apparatus for detecting an abnormal condition occurring in a vehicle; and
   an emergency communication service apparatus for notifying a response center of an emergency state during an emergency, wherein said security apparatus and said emergency communication service apparatus are connected so that information can be transmitted and received between them, the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition and an abnormal-condition-detected sensor name via the response center; and when the emergency communication service apparatus receives, from a response center, a confirmation command inquiring whether the security apparatus is armed, the emergency communication service apparatus identifies the operating state of the security apparatus and notifies the response center.

6. A security and emergency communication service coordination system according to claim 5, wherein said emergency communication service apparatus is operable to receive, from the response center, a command for arming, which the emergency communication service apparatus transmits to the security apparatus.

7. A security and emergency communication service coordination system according to claim 5, wherein when the security apparatus is not armed, the emergency communication service apparatus is operable to cause the security apparatus to be armed.

8. A security and emergency communication service coordination system for vehicles, comprising:
   a security apparatus for detecting an abnormal condition occurring in a vehicle and for issuing an alarm; and
   an emergency communication service apparatus for notifying a response center of an emergency state during an emergency, wherein the security apparatus and the emergency communication service apparatus are connected so that information can be transmitted and received between them, the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition and an abnormal-condition-detected sensor name via the response center; and when the emergency communication service apparatus receives, from a response center, a command for arming, the emergency communication service apparatus transmits the command to the security apparatus.

9. A notification control method for use with a security and emergency communication service coordination system for vehicles, said notification control method comprising the steps of:
   notifying an emergency communication service apparatus of an abnormal-condition-detected sensor name when an abnormal condition occurring in a vehicle is detected by a security apparatus;
   the emergency communication service apparatus obtaining the current position of a subject vehicle by a global positioning system receiver when the emergency communication service apparatus receives an abnormal-condition-detected notification, and transmitting the vehicle ID number, the abnormal-condition-detected sensor name, and the vehicle position information to a response center; and
   the response center determining, by referring to a database, the contact-location number corresponding to the vehicle ID number contained in the received data, and notifying a user of the occurrence of the abnormal condition; wherein when the response center cannot contact a first contact location corresponding to the vehicle ID number, the response center calls and notifies another contact location corresponding to the vehicle ID number.

10. A notification control method for use with a security and emergency communication service coordination system for vehicles, said notification control method comprising the steps of:

notifying the emergency communication service apparatus of an abnormal-condition-detected sensor name when an abnormal condition occurring in a vehicle is detected by a security apparatus;

the emergency communication service apparatus obtaining the current position of the subject vehicle by a global positioning system receiver when the emergency communication service apparatus receives an abnormal-condition-detected notification, picking up sounds from within the vehicle by a microphone disposed within the vehicle, and transmitting the sounds from within the vehicle together with the vehicle ID number, the abnormal-condition-detected sensor name, and the position information of the subject vehicle to a response center; and the response center judging the situation of the subject vehicle from the sounds from within the vehicle, and sending an alarm termination command to the emergency communication service apparatus from the response center when the response center determines that the abnormal condition is caused by the malfunction of the sensor and sending a command for issuing an alarm when the abnormal condition is not caused by the malfunction of the sensor.

11. A notification control method according to claim 10, wherein said emergency communication service apparatus notifies the security apparatus of the received command, and the security apparatus performs an operation in accordance with the received command.

12. A notification control method for use with a security and emergency communication service coordination system for vehicles, said notification control method comprising the steps of:

providing a security apparatus for detecting an abnormal condition occurring in a vehicle and for issuing an alarm and an emergency communication service apparatus for notifying a response center of an emergency state during an emergency, wherein the security apparatus and the emergency communication service apparatus are connected so that information can be transmitted and received between them, the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition and an abnormal condition-detected sensor name via the response center;

a user instructing a response center to confirm that the security apparatus is armed;

the response center sending an armed-state confirmation command to the emergency communication service apparatus;

the emergency communication service apparatus determining whether the security apparatus is armed, sending armed-state information to the response center when the security apparatus is armed, and transmitting disarmed-state information to the response center when the security apparatus is disarmed; and the response center notifying the user of the armed-state or disarmed-state of the security apparatus.

13. A notification control method according to claim 12, wherein when arming is instructed by the user, the response center transmits an arming command to the security apparatus via the emergency communication service apparatus so that the security apparatus is placed in an armed mode.

14. A notification control method according to claim 12, wherein if the security apparatus is in a disarmed mode, the security apparatus is automatically placed in an armed mode.

15. A security and emergency communication service coordination system for vehicles, comprising:

a security apparatus for detecting an abnormal condition occurring in a vehicle and for issuing an alarm;

an emergency communication service apparatus for notifying a response center of an emergency state during an emergency, wherein the security apparatus and the emergency communication service apparatus are connected so that information can be transmitted and received between them; the coordination system operating so that when the security apparatus detects an abnormal condition occurring in the vehicle, the security apparatus notifies the emergency communication service apparatus of the occurrence of the abnormal condition, and in response to the notification, the emergency communication service apparatus notifies a user of the occurrence of the abnormal condition and an abnormal-condition-detected sensor name via the response center; and a buffer including at least one data storage area;

wherein the buffer is operable to receive data from or transmit data to either of the security apparatus and the emergency communication service apparatus.

16. A security and emergency communication service coordination system according to claim 15, wherein the buffer includes a first data storage area for storing data to be transmitted from the security apparatus to the emergency communication service apparatus, and a second data storage area for storing data to be transmitted from the emergency communication service apparatus to the security apparatus.

17. A security and emergency communication service coordination system according to claim 16, wherein the emergency communication service apparatus reads the contents of the first data storage area at a predetermined cycle, and the security apparatus reads the contents of the second data storage area at a predetermined cycle.

18. A security and emergency communication service coordination system according to claim 16, wherein the data stored in the second data storage area may include a command to the security apparatus to sound a continuous alarm, or a command to the security apparatus to stop an alarm.

19. A security and emergency communication service coordination system according to claim 16, wherein the data stored in the second data storage area may include a query to check whether the security apparatus is armed.

20. A security and emergency communication service coordination system according to claim 19, wherein the security apparatus is automatically set to an armed mode if the result of the query is that the security apparatus is not armed.

21. A security and emergency communication service coordination system according to claim 16, wherein the data stored in the second data storage area may include a command to arm the security apparatus.

22. A security and emergency communication service coordination system according to claim 15, wherein the user notification is transmitted by the emergency communication service apparatus to a response center located apart from the vehicle.

23. A security and emergency communication service coordination system according to claim 22, wherein the transmitted user notification includes an identification of the occurrence of an abnormal condition as detected by the security apparatus.

24. A security and emergency communication service coordination system according to claim 23, wherein the transmitted user notification further includes an ID number of the vehicle.

25. A security and emergency communication service coordination system according to claim 24, wherein the transmitted user notification further includes an identification of a sensor detecting the abnormal condition.

26. A security and emergency communication service coordination system according to claim 24, wherein the transmitted user notification further includes sounds from within the vehicle.

* * * * *